United States Patent [19]
Yamashita et al.

[11] 4,350,673
[45] * Sep. 21, 1982

[54] METHOD OF STORING HYDROGEN

[75] Inventors: Toshio Yamashita, Katano; Takaharu Gamo, Fujiidera; Yoshio Moriwaki, Moriguchi; Masataro Fukuda, Toyonaka, all of Japan

[73] Assignee: Matsushita Electric Industrial Company, Limited, Osaka, Japan

[*] Notice: The portion of the term of this patent subsequent to Oct. 14, 1997, has been disclaimed.

[21] Appl. No.: 8,932

[22] Filed: Feb. 2, 1979

Related U.S. Application Data

[62] Division of Ser. No. 686,067, Jun. 10, 1976, abandoned.

[51] Int. Cl.$^3$ .............................................. C01B 6/24
[52] U.S. Cl. .................................... 423/644; 420/417; 420/434; 420/900
[58] Field of Search .............. 75/134 M, 175.5; 34/15; 423/644

[56] References Cited

U.S. PATENT DOCUMENTS 3,508,414 4/1970 Wiswall et al. .......................... 62/48
3,516,263 6/1970 Wiswall et al. .......................... 62/48
3,922,872 12/1975 Reilly et al. ......................... 75/175.5
4,228,145 10/1980 Gamo et al. ...................... 75/134 M

OTHER PUBLICATIONS

Someno et al., Journal of the Japan Institute of Metals, vol. 34, 1970, pp. 273-279.
Someno et al., Journal of the Japan Institute of Metals, vol. 35, 1971, pp. 103-106.
Waterstrat et al., Transactions of the Metallurgical Society of AIME, vol. 224, Jun. 1962, pp. 512-518.
Hansen, Constitution of Binary Alloys, 2nd Edition, 1958, pp. 722-727, 958-959.

Primary Examiner—R. Dean
Attorney, Agent, or Firm—Stevens, Davis, Miller & Mosher

[57] ABSTRACT

There is described an alloy metal hydride for storing and releasing hydrogen at predetermined temperatures and pressures intended for storing and transporting said hydrogen and also for use as a hydrogen supply source of a fuel cell and fuel electrode. The alloy of this invention consists of 30 to 80 percent by weight Ti and 20 to 70 percent by weight Mn having a high dissociation pressure, easy hydrogen activation, low heat of formation of hydrides and a very fast rate of absorption and desorption, also the alloy is of light weight and of low cost, therefore being of great industrial use.

6 Claims, No Drawings

METHOD OF STORING HYDROGEN

This is a division of application Ser. No. 686,067, filed June 10, 1976, abandoned.

This invention relates to an alloy for storing and releasing hydrogen at predetermined temperatures and pressures respectively. It is already known that metals or alloys containing transition metal groups are able to store a large amount of hydrogen by way of forming metal hydrides. However, these hydrides are, in most cases, thermodynamically very stable so that they release hydrogen stored in the crystal lattice only at such high temperatures as 400° C. and above. The following are the requirements which the hydrogen storing material must satisfy.

(1) The hydrogen absorbing capacity must be large both for weight and volume.

(2) It must be stable chemically as well as thermodynamically at an ambient temperature and have a suitable dissociation pressure of several times atmospheric pressure.

(3) A sufficient absorption and desorption rate of hydrogen under the conditions required for practical use.

(4) Stable characteristics or performance even after having been subjected to repeated absorption and desorption cycles.

(5) It must be unsusceptible to the influence of impurities entrapped in the hydrogen gas and be easily regenerated when the materials are degraded by said impurities.

(6) The density of the hydrides should be as low as possible.

(7) It must be inexpensive.

(8) The heat of formation of the hydride must be as low as possible.

Recently, hydrides of lanthanide alloys have been developed but were found to be unsuitable for industrial use because their production costs are extremely high, they are relatively heavy and are too sensitive to impurities in the hydrogen gas to be stored. Also, hydrides of conventional Ti-Fe alloys and Ti-Ni alloys do not satisfy the conditions itemized in (1), (2), (3), (5), (6) and (8) above and in particular have a serious drawback of having comparatively less activation of hydrogen. This invention provides novel metal hydrides for storage and transportation of hydrogen and also for a hydrogen supply source for a fuel cell and hydrogen electrode.

The inventors of this invention found that some alloy phases of the Ti-Mn system; for example TiMn, readily absorb large amounts of hydrogen at room temperature and at a relatively low pressure of only about several times atmospheric pressure, and the hydrides of these alloy phases release the absorbed hydrogen at a suitably fast rate when the hydrides are placed under certain combined conditions of temperature and pressure. In other words, Ti-Mn alloys in the solid state containing 30 to 80 weight percent of Ti and 20 to 70 weight percent of Mn, preferably containing about 45 weight percent of Ti and 55 percent of Mn, absorb hydrogen equal to 2.5 percent in weight of the alloy used, when they are placed directly in contact with hydrogen gas at several times atmospheric pressure at an ambient temperature, and they also release a large amount of hydrogen thus absorbed reversibly and readily at room temperature and at another predetermined pressure. The alloys of this invention are not required to be crushed before the hydriding step but can be used as in lump form, while conventional alloys such as the Ti-Ni and Ti-Fe systems must be previously crushed prior to their initial hydriding step.

The alloys of this invention in lump form are able to readily absorb hydrogen without being subjected to any pretreatment and thereafter they disintegrate into fine powders without having an external force applied thereto. The alloys of this invention can be obtained by conventional melting technique such as an argon-arc melting process.

Alloy lumps thus obtained are unifrom in quality and are fairly brittle and thus can be crushed by any mechanical means.

When a hydrogen gas is introduced and contacted with these alloy lumps, it is absorbed by the alloy lumps at a fairly fast rate and as a result, hydrides such as $TiMnH_{2.5}$ are formed and eventually take the powder state having a grain size of less than 10 micron.

At room temperature, neither oxide layer nor nitride layer is formed on this Ti-Mn alloy. Moreover, the inventive alloys readily absorb hydrogen gas and desorb it without being influenced by any impurities entrapped in the hydrogen gas. These alloys are also able to purify hydrogen.

No special container construction is required for absorbing hydrogen by using the alloy of this invention. An air-tight container for containing alloy hydride powder is satisfactory for utilizing this invention. Also, no special consideration of temperature is needed.

The following is a working example for forming metal hydrides according to this invention.

As starting materials, for example rod-shaped metallic titanium having a diameter of 8 mm and a length of 10 mm, of 99.9 percent grade purity, and metallic manganese plate being 10 mm square and having a thickness of 1.5 mm of 99.2 percent grade purity were directly melted together in an argon arc furnace into a Ti-Mn alloy.

The button shaped Ti-Mn alloys thus prepared were broken down into several pieces and placed in a hydriding reactor vessel made of stainless steel, and the vessel was evacuated for about 1 minute by a rotary pump.

Hydrogen gas of 99.9 percent purity was introduced into the vessel until the internal pressure of the vessel reached about twenty atmospheric pressures. Then the alloy began to absorb the hydrogen, the volume of the thus absorbed hydrogen amounting to 2 to 5 liters within several minutes and the weight of the used alloy being 10 gr.

As a result, in a powder state, a hydride of Ti-Mn was formed, while generating heat of formation of hydride which heated the vessel to some extent.

Desorption of the absorbed hydrogen was carried out in entirely the same manner as in a conventional hydrogen bomb, and was available for release by merely opening a valve.

Adjustment of the desorption rate of the hydrogen gas is performed either mechanically by any reducing valve or by controlling the pressure or temperature of the ambient hydrogen.

Absorption of hydrogen gas is performed again and repeatedly in an entirely similar manner.

There exists a certain relationship between the composition of the Ti-Mn hydrides and the number of absorbed hydrogen atoms ($H_x$) per one mole of TiMn alloy at room temperature. Absorption and desorption of the hydrogen at room temperature becomes considerably less, thus a superior property of this alloy is lost when the content of Mn in the alloy lies in the ranges of less than 20 percent and more than 70 percent by weight.

Also, the amount of absorbed hydrogen within the range of 20 to 70 percent by weight Ti increases as the content of Mn increases. On the other hand, the amount of hydrogen desorbed shows maximum at about 37 weight percent Ti then begins to decrease as the content of Ti increases above said 37 percent Ti.

In view of this tendency of desorption, the preferable range of Ti content within which the alloy displays a 50 percent hydrogen desorption ratio of desorbed hydrogen to absorbed hydrogen was selected as 35 to 50 weight percent Ti. Also it was found that the less the Mn content in the alloy is, the lower the equilibrium dissociation pressure of the hydrogen becomes.

Distinguishable features of the Ti-Mn hydrides of this invention as described above can be summarized as follows:

(1) Has an equilibrium dissociation pressure of hydrogen of less than several atmospheric pressures.

(2) Activation of hydrogen is very easy.

(3) Has low heat of formation of hydrides.

(4) Rates of absorption and desorption of hydrogen are very fast at room temperature.

(5) Repeated cycling of absorption and desorption do not change the performance of the alloy.

(6) Is very much less susceptible to impurities in the hydrogen gas.

(7) Comparatively low in cost.

(8) Stable at service condition and guarantee safety.

(9) Has considerably high amount of hydrogen absorption equal to about 1.5 times that of Fe-Ti system.

Furthermore, Ti-Mn alloys of this invention are not limited to only binary alloys of Ti and Mn but other Ti or Mn base alloys within the above-mentioned Ti and Mn content range and further containing third or fourth alloying elements such as Cu, Ni and Co and so on also display similar superior properties for storaging hydrogen according to this invention.

What is claimed is:

1. A method of storing hydrogen comprising contacting gaseous hydrogen with a solid binary titanium-manganese alloy, said alloy consisting of 35 to 50 percent by weight of titanium, the remainder being manganese.

2. A method according to claim 1, wherein the alloy consists of about 45 percent by weight of titanium and about 55 percent by weight of manganese.

3. A method according to claim 1, wherein the alloy consists of about 37 percent by weight of titanium and the balance being manganese.

4. A method of storing and releasing gaseous hydrogen comprising the steps of:
preparing a binary Ti-Mn alloy consisting of 35 to 50% by weight of Ti, the remainder being Mn;
contacting the alloy with gaseous hydrogen under a predetermined combined condition of pressure and temperature until said alloy absorbs a predetermined amount of hydrogen; and,
subjecting said alloy to another predetermined combined condition of pressure and temperature to desorb a substantial amount of the absorbed hydrogen.

5. A method according to claim 4, wherein said alloy is contacted with gaseous hydrogen at ambient temperature.

6. A method according to claim 4 or 5, wherein said steps of absorbing and desorbing gaseous hydrogen are repeated.

* * * * *